United States Patent [19]

de Fontenay

[11] Patent Number: 4,893,799
[45] Date of Patent: Jan. 16, 1990

[54] VIBRATION ISOLATION APPARATUS

[75] Inventor: Etienne de Fontenay, Decize, France

[73] Assignee: Kleber Industrie, Versailles Cedex, France

[21] Appl. No.: 147,296

[22] Filed: Jan. 22, 1988

[30] Foreign Application Priority Data

Jan. 23, 1987 [FR] France ................... 87 00762

[51] Int. Cl.⁴ .............................. F16F 9/00
[52] U.S. Cl. ......................... 267/140.1; 180/300; 180/312; 180/902; 248/562; 248/636; 384/320
[58] Field of Search ............. 267/140.1, 219, 220; 248/562, 636; 384/99, 215, 220; 180/300, 312, 902

[56] References Cited

U.S. PATENT DOCUMENTS

| 4,632,370 | 12/1986 | Ticks et al. ............ | 267/140.1 X |
| 4,705,410 | 11/1987 | Broock ................. | 267/140.1 X |
| 4,768,760 | 9/1988 | Le Fol ................. | 267/140.1 |
| 4,790,520 | 12/1988 | Tanaka ................. | 267/140.1 |

FOREIGN PATENT DOCUMENTS

| 0027751 | 4/1981 | European Pat. Off. . |
| 0213324 | 3/1987 | European Pat. Off. . |
| 3617787 | 11/1986 | Fed. Rep. of Germany ...... 267/219 |
| 2335744 | 6/1978 | France . |
| 2495718 | 6/1982 | France . |
| 2443615 | 1/1983 | France . |
| 2441101 | 11/1983 | France . |
| 2462618 | 4/1984 | France . |
| 2551161 | 3/1985 | France . |
| 57-94147 | 6/1982 | Japan . |
| 57-941466 | 6/1982 | Japan . |
| 203242 | 11/1983 | Japan ................. 267/140.1 |
| 60-34542 | 2/1985 | Japan . |
| 88834 | 4/1987 | Japan ................. 267/140.1 |

Primary Examiner—George E. A. Halvosa
Attorney, Agent, or Firm—Thomas N. Ljungman

[57] ABSTRACT

Antivibration isolation device with hydraulic damping of radial elasticity, consisting of four concentric tubes bonded two by two to the elastic lateral walls, which by simultaneous fitting form two chambers connected by a long laminar passage for an inertial damping fluid, shunted by limited deformation of a thin membrane, to modulate the apparent dynamic rigidity as a function of the frequency. Process for the realization of such a device. The object of the invention is to provide antivibration isolation for machines or motor vehicles.

13 Claims, 3 Drawing Sheets

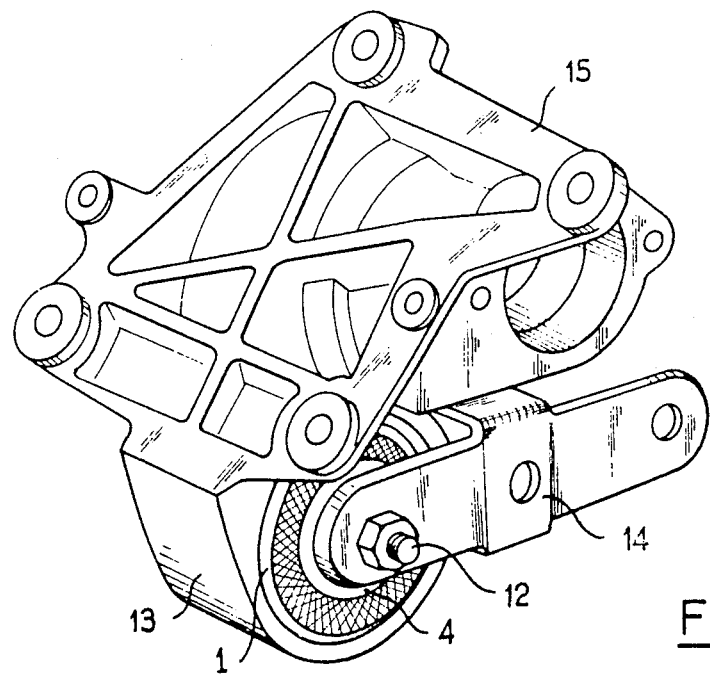
FIG_1
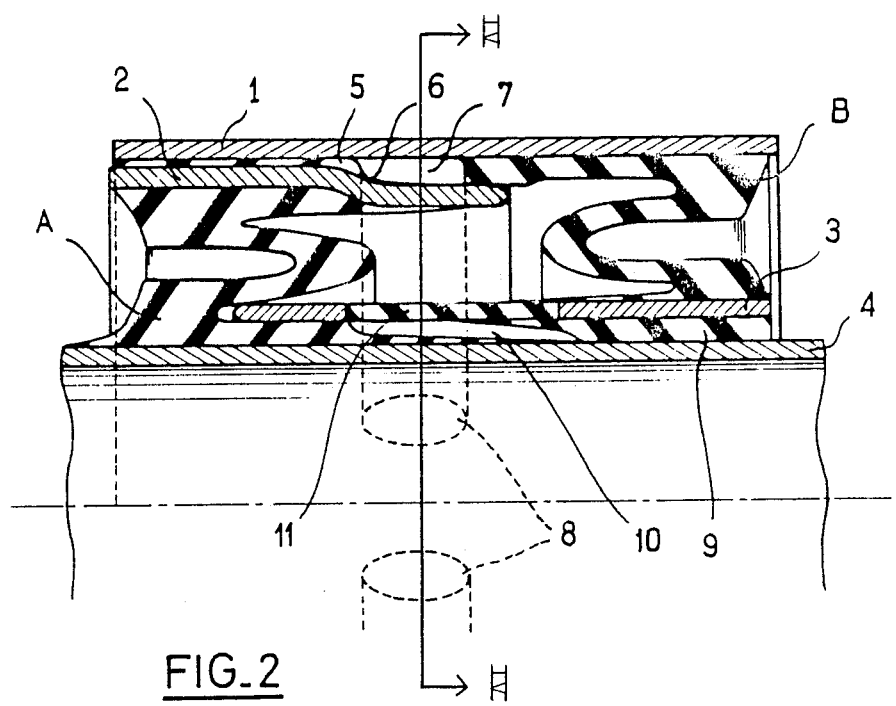
FIG_2

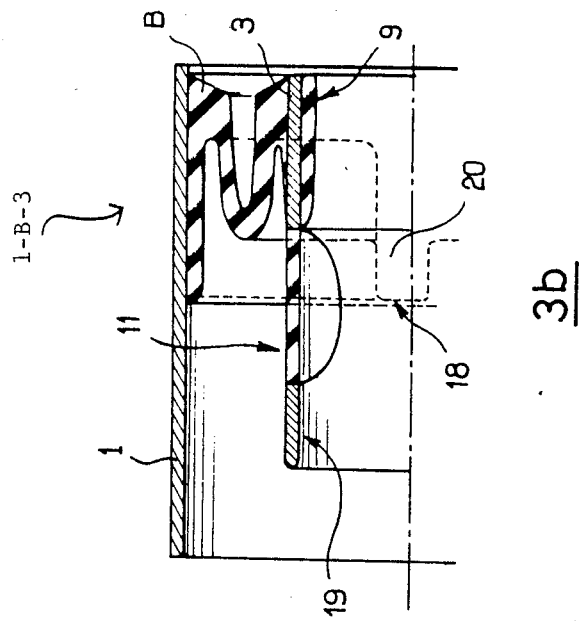
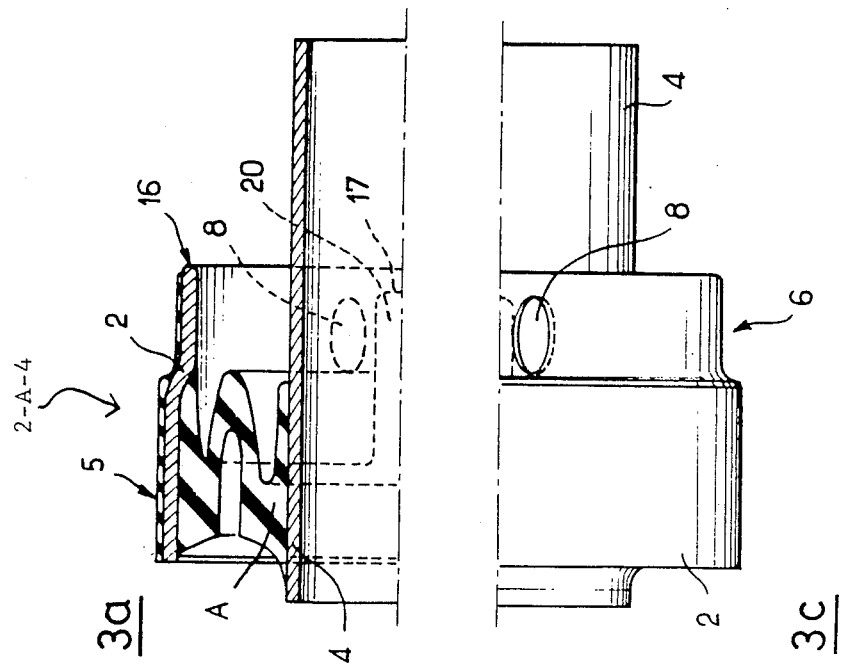

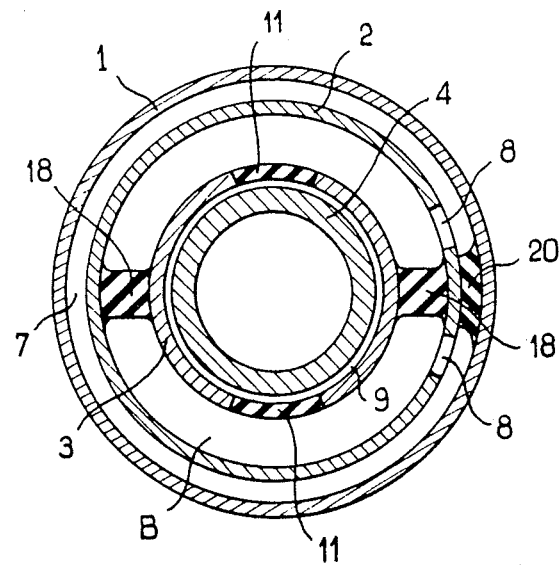
FIG_4
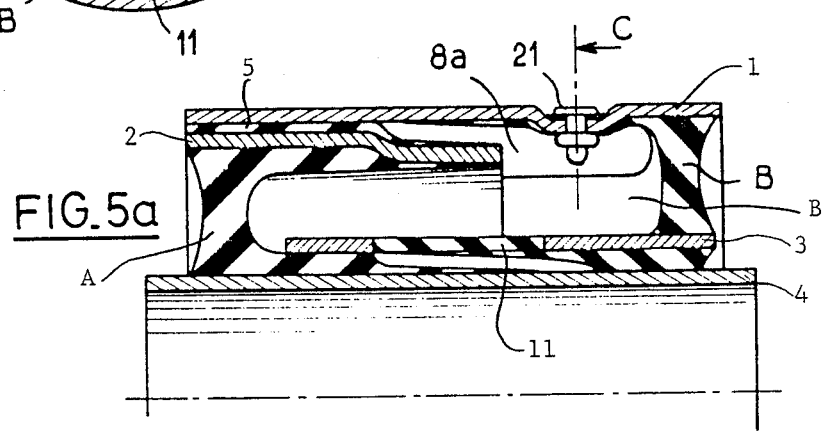
FIG_5a
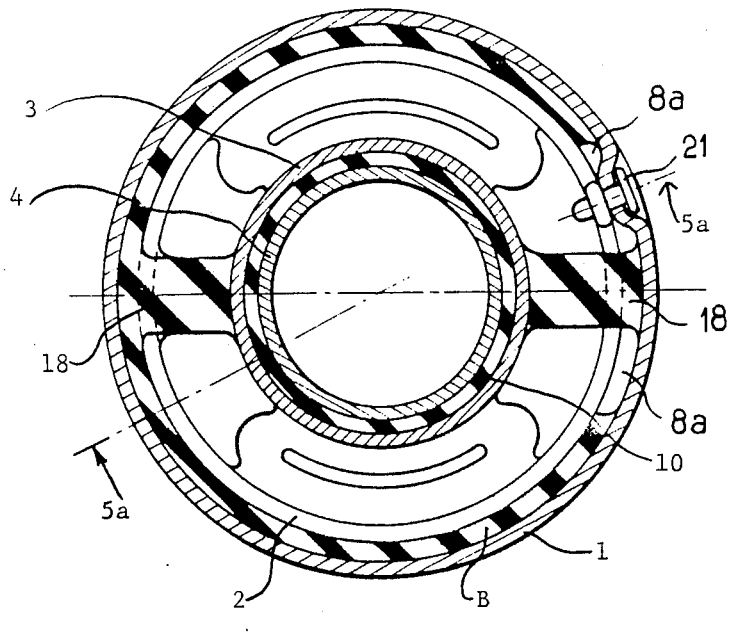
FIG_5b

VIBRATION ISOLATION APPARATUS

CROSS-REFERENCE TO CO-PENDING APPLICATIONS

Co-pending application Ser. No. 07/147,342, (Attorney Docket No. NHL-KLE-02) filed on Jan. 22, 1988, entitled "Vibration Isolation Apparatus", now U.S. Pat. No. 4,834,350, which corresponds to French Patent Application No. 8700314, filed on Jan. 23, 1987, is assigned to the same assignee as and is related to the instant application.

BACKGROUND OF THE INVENTION

1. Field of the Invention

This invention relates to the field of antivibration isolation devices for machines, and in particular, to the field of elastic supports for motor vehicles.

It relates to the family of these elastic supports which exhibit great flexibility, improving the filtering of high vibration frequencies, where the risk of resonance at the characteristic frequency of the suspended masses is avoided by the hydraulic damping function integrated into the device.

The invention is adapted in particular to an arrangement in current use, in particular in power units of the transverse type in front-wheel drive vehicles, where at least one of the suspension points of said assembly is a cylindrical elastic part, force fitted by a tube which is an integral part of it, in a socket made either in a housing, or in a support installed, during assembly, on the power unit, and traversed by a shaft which makes possible fastening to the frame by a flange, or by means of a cantilever bolt.

2. Description of the Prior Art

The prior art shows that the geometry of revolution easily makes it possible to put, between rigid elements, a bonded elastomer which provides radial rigidity and acts as a gradual stop from a free zone of great flexibility of several millimeters to a controlled elasticity, but one which is, for example, five times higher, over a linear distance which is even shorter.

This controlled elasticity is necessary to react to the motor torque and to the motor braking in the two directions in which the power unit swings.

Devices using this geometry make it possible, by means of the use of appropriate cells, to obtain different flexibilities in the three directions, on one hand, and variations of the radial rigidity, on the other hand, variations due to the closing of these cells, which ensure high flexibilities and, consequently, the low suspension frequencies required for good antivibration filtering. Such devices are described, for example, in French Patent No. FR 2,335,744 (Citroen) and French Patent No. FR 2,441,101 (Nissan).

French Patent No. FR 2,551,161 (Tokay Rubber) proposes an elastic sleeve coupling, filled with fluid, where a revolving sleeve comprises two opposite chambers and a fluid circulation damped by passage through orifices, as well as an internal stop which limits radial travel.

The above-mentioned patents are incorporated herein by reference as if the entire contents thereof were fully set forth herein.

In addition, axially flexible mountings consisting of conical springs enclosing a hydraulic damping chamber have been improved, in particular, by the use of a long column of inertial liquid which, at low frequency, increases the apparent rigidity. Such devices are described in continuation FR 2,462,618 and French Patent No. FR 2,443,615 and European Patent No. EP 027,751 by Peugeot and Citroen.

An analysis of the prior art shows, apparently, that there are not hydraulic damping devices specifically adapted to a particular frequency and associated with a geometry of revolution.

OBJECT OF THE INVENTION

The object of the invention is, therefore, to apply to a geometry of revolution, and offering the advantages of radial rigidity, the inertial effects of an inertial liquid column, of great length and sufficiently large cross section so that, for the most part, it does not have to call on the viscosity of the liquid to brake the liquid movements from one chamber to another.

SUMMARY OF THE INVENTION

The invention consists of an elastic antivibration isolation device with radial hydraulic damping, and processes for the realization of such a device.

The antivibration device for hydraulic damping of radial elasticity which is the object of the invention, consists of two concentric tubes, connected by two elastic walls, made of an elastomer compound, arranged so that they enclose two chambers filled with damping liquid.

Since the volume of the assembly remains relatively constant in the eccentric elastic deformations between the two tubes, the two chambers communicate with one another by means of a laminar passage, which is narrow and very long, compared to its cross section, located between the external rigid tube and a second tube, bonded to one of the deformable walls and force fitted into the first tube.

The laminar passage runs between an orifice made in each chamber, and describing at least three-quarters of the annular space between the external rigid tube and the second tube. During large swinging motions during operation, the inertia of the long column of liquid contained in the laminar passage prevents displacements and may significantly, and undesirably, increase the apparent rigidity of the elastic antivibration isolation device.

To counter the risk, the invention comprises a device which overcomes this blocking effect, and which consists of flexible windows realized by means of a deformable membrane, cut in a third rigid tube closing the chambers, and rigidly attached to a fourth, interior, tube by means of which it is attached to the support frame.

A small movement by the flexible membrane, which comes into contact with the fourth, internal tube, very significantly reduces the dynamic return rigidity between the tubular constituents, over a limited movement distance, beyond which the blockage due to the inertia of the column takes effect.

The antivibration isolation device for radial hydraulic damping which is the object of the invention, as well as several variants, is explained in greater detail in the following description, with reference to the accompanying figures.

In one aspect, the invention features a vibration isolation apparatus. The apparatus comprises: an external tube member; a first intermediate tube member positioned substantially concentric with and within the external tube member; the external tube member and the first intermediate tube member forming a first annular space therebetween; at least one additional tube member positioned substantially concentric with and within the first intermediate tube member; the first intermediate tube member and the at least one additional tube member forming a second annular space therebetween; first and second flexible lateral end wall apparatus for flexibly positioning and interconnecting the opposing ends of the external tube member, the first intermediate tube member and the at least one additional tube member, thereby enclosing the first and second annular spaces; a first substantially nonpermeable partition positioned within the first annular space and extending between the first and second flexible lateral end wall apparatus; substantially nonpermeable divider arrangement for dividing the second annular space into first and second chambers; first orifice apparatus for establishing communication between the first annular space and the first chamber; second orifice apparatus for establishing communication between the first annular space and the second chamber; and a damping fluid contained within the first annular space and the first and second chambers.

In another aspect, the invention features a process for the manufacture of a vibration isolation apparatus. The process comprises the steps of: (a) providing a first subassembly, the first subassembly comprising an internal tube member, a first intermediate tube member and first flexible lateral end wall apparatus, the internal and the first intermediate tube members being maintained in spaced and concentric alignment by their mutual attachment to the first flexible lateral end wall apparatus; (b) providing a second subassembly, the second subassembly comprising an external tube member, a second intermediate tube member and second flexible lateral end wall apparatus, the external and second intermediate tube members being maintained in spaced and concentric alignment by their mutual attachment to the second flexible lateral end wall apparatus; (c) submerging the first and second subassemblies in a bath of a damping fluid; (d) removing substantially all air bubbles from the submerged first and second subassemblies; (e) concentrically and axially mating the first and second subassemblies, such that, in the assembled configuration, the internal tube member is positioned substantially concentric with and within the second intermediate tube member, the second intermediate tube member is positioned substantially concentric with and within the first intermediate tube member, and the first intermediate tube member is positioned substantially concentric with and within the external tube member; and (f) maintaining the concentrically and axially mated first and second subassemblies in the assembled configuration.

In a further aspect, the invention features a process for the manufacture of a vibration isolation apparatus. The process comprises the steps of: (a) providing an assembly, the assembly comprising an external tube member, a first intermediate tube member positioned substantially concentric with and within the external tube member, the external tube member and the first intermediate tube member forming a first annular space therebetween, at least one additional tube member positioned substantially concentric with and within said first intermediate tube member, the first intermediate tube member and the at least one additional tube member forming a second annular space therebetween, first and second flexible lateral end wall apparatus for flexibly positioning and interconnecting the opposing ends of the external, first intermediate and at least one additional tube member and thereby enclosing the first and second annular spaces, a first substantially nonpermeable partition positioned within the first annular space and extending between the first and second flexible lateral end wall apparatus, substantially nonpermeable divider means for dividing the second annular space into first and second chambers, first orifice apparatus for establishing communication between the first annular space and the first chamber, and second orifice apparatus for establishing communication between the first annular space and the second chamber; (b) crimping the external tube member; (c) providing a through going hole in the external tube member; (d) removing the gas contained in the assembly through the through going hole; (e) submerging the assembly in a bath of a damping fluid; (f) allowing the damping fluid to enter the assembly through the through going hole; and (g) plugging the throughgoing hole with rivet apparatus.

In a preferred embodiment of the process described immediately above, the at least one additional tube member includes a second intermediate tube member positioned substantially concentric with and within the first intermediate tube member and an internal tube member positioned substantially with and within the second intermediate tube member, the first intermediate tube member and the second intermediate tube member forming a second annular space therebetween and the second intermediate tube member and the internal tube member forming a third annular space therebetween.

BRIEF DESCRIPTION OF THE DRAWINGS

FIG. 1 illustrates the device used as an elastic support for a power unit;

FIG. 2 is an axial section showing the components of the device in place;

FIGS 3a and 3b show the components before the assembly operation by fitting or crimping, and FIG. 3C shows the exterior of tubes 2 and 4;

FIG. 4, which is a sectional view taken along the line IV—IV in FIG. 2, illustrates the communications between the chambers; and FIGS. 5a and 5b show one variant of the device.

DESCRIPTION OF THE PREFERRED EMBODIMENTS

FIG. 1 shows the overall layout of the device used as an elastic support for a power unit.

An external rigid tube 1, generally made of metal, designed to be force fitted, e.g., during the preparatory operation away from the assembly line, into the socket of a fastening element 13 which is rigidly mounted on the housing 15 of the power unit to be suspended, is assembled by means of an elastic joint on a rigid internal tube 4, generally made of metal or plastic, and sufficiently thick to allow the tightening of a bolt 12 which runs all the way through, affixed by means of a coupling element 14 to the frame, as shown; it can also be axially screwed into or onto a flange performing the same function.

FIG. 2 is an axial cross section, along a vertical plane, showing the components of the device in place.

The external rigid tube 1, designed to be fitted into the socket of the machine to be suspended, and the rigid concentric intermediate tube 3 are bonded, during the vulcanizing operation, to the lateral elastic wall B using processes which are well known in the rubber processing industry.

The rigid intermediate tube 2 and the rigid internal tube 4 are likewise bonded to the opposite elastic lateral wall A. The rigid internal tube 4 is designed to be attached, by a flange or a cantilever bolt, to the fixed chassis.

The rigid intermediate tube 2 is fitted locally and in a sealed manner, into the rigid external tube 1, either axially, or by a radial crimping machine, by spreading, over no more than one-half the length of the rigid intermediate tube 2, a thin layer of elastomer compound 5, to ensure a seal with the elastic lateral wall A.

The rigid intermediate tube 2 is crimped over the portion of its length not in contact with the thin layer of elastomer compound 5, in a zone 6, essentially in the center plane of the assembly. The crimped zone 6 of the rigid intermediate tube 2, mated with a noncontinuous groove made in the elastomer compound inside the rigid external tube 1, forms a laminar passage 7 which will contain the damping liquid contained in the vessel after fitting. The manner in which the crimped zone 6 of rigid intermediate tube 2 mates with a noncontinuous groove provided in the elastomer compound positioned on the inner wall of rigid external tube 1 is described more fully below.

The two chambers of the vessel communicate with one another by means of two holes 8 made in the rigid intermediate tube 2 and which must be close to one another, so that the length of the laminar passage 7 is equal to at least three-quarters of the length of the annular space between the rigid external tube 1 and the rigid intermediate tube 2. The holes 8 must, nevertheless, be located on either side of pads of elastomer compound formed by local excrescences of the elastic side walls A and B to close the two chambers, in an essentially horizontal plane in the figure.

The rigid intermediate tube 3 is fitted, in a simultaneous operation, over the rigid internal tube 4, either axially or by the expansion of said rigid internal tube 4, by spreading a film of elastomer compound 9 to provide a seal in the annular gap 10 in certain configurations of the device.

Thin membranes 11 of elastomer compound are formed, in the most simple manner, by filling with the elastomer compound, during casting, the gaps constituted by the large windows made in the rigid intermediate tube 3. A groove is formed in the elastomer compound film 9 spread between the rigid intermediate tube 3 and the rigid internal tube 4. This groove provides communication between the surfaces of membranes 11 and the ambient atmosphere. This configuration makes it possible to regulate the rigidity of the device to the desired value for the utilization frequencies.

In a second configuration, damping liquid is imprisoned in the annular space 10, during the simultaneous fitting operation performed in the damping liquid, using what might be termed a "submarine" process.

If the windows cut in the rigid intermediate tube 3 are all the same size, the deformation of the thin membranes 11 which close them will be equal and opposite and, since the volume of the annular space 10 is essentially constant, the passage of the damping liquid confined therein from one window to the other will have a parasitic inertial effect, similar to that of the principal damping liquid column of the laminar passage 7. It will then be possible to take advantage of these two different inertial effects to block the relative rigidity of the device at two different frequencies, i.e., it will become possible to have a minimum rigidity between the two resonances, within the desired range of excursions, depending on the requirements of the individual application.

FIGS. 3a, 3b are partial section, identical to FIG. 2, but showing the components of the device before the fitting or crimping operation has been performed, e.g., using the "submarine" method, with the constituent elements immersed in the damping liquid.

FIG. 3a shows the first component, fabricated as an elastic joint of the rubber/metal type, which consists of the rigid intermediate tube 2, bonded by means of the elastic lateral wall A to the rigid internal tube 4. For purposes of illustration, this component will be designated below as the tube assembly 2-A-4.

The shape of the elastic lateral wall A is shown, for purposes of illustration only and not intended to limit the invention in any way, with a generally circular cross section, with the exception of the pads (or bosses) 20, located in the horizontal plane, to close the left half of the upper and lower chambers enclosing the damping liquid.

The rigid intermediate tube 2 is covered, externally, and at least over the uncrimped length, by a thin layer of elastomer compound 5, intended to provide a seal.

The rigid intermediate tube 2 is crimped in a zone 6 not in contact with the end of the elastic lateral wall A to form a passage 7 which accommodates the column of damping liquid.

Two holes 8, located on either side of the horizontal plane, after the burrs of the elastomer compound have been removed, provide communication between the chambers and said column of damping liquid.

The end 16 of the rigid intermediate tube 2, which is used for fitting in the base of the elastic lateral wall B, bonded to the rigid external tube 1, is advantageously bevelled for this purpose.

FIG. 3b shows the second component, also fabricated as an elastic joint of the rubber/metal type, which consists of the rigid external tube 1, bonded by means of the elastic lateral wall B to the rigid intermediate tube 3. This second component will be designated below as the tube assembly 1-B-3.

The shape of the elastic lateral wall B can be very similar to that of the elastic lateral wall A and, as shown merely for purposes of illustration, and not intended to limit the scope of the invention in any way, has a generally circular cross section, with the exception of pads (or bosses) 20 located in the horizontal plane, to close the right half of the upper and lower chambers housing the damping liquid. During fitting, the end 18 of the pad 20 of the elastic lateral wall B comes into contact with the end 17 of the pad 20 on the elastic lateral wall A.

The rigid intermediate tube 3 is coated over a portion of its internal surface, with the elastomer compound film 9 intended, in certain configurations, to provide the seal on the rigid internal tube 4. Since the free end 19 of rigid intermediate tube 3 is intended to fit into a recessed zone provided in elastic lateral wall A, bonded to the rigid internal tube 4, free end 19 is advantageously bevelled for this purpose.

With particular reference to FIGS. 3a, 3b and 4, the manner in which the pads (or bosses) 20 are configured so as to, upon assembly, form the partitions 18 and 20 shown in FIG. 4 will now be described.

FIG. 3b shows (in phantom) a pad (or boss) 20 having a terminal end 18. Boss 20 is contiguous with elastic end wall B and is a peninsular extension thereof which extends therefrom towards the interior of the assembled device. Boss 20 in FIG. 3b extends between external tube 1 and second intermediate tube 3. Thus, in FIG. 3b, boss 20 is shown in phantom as being positioned and extending between the exterior wall of second intermediate tube 3 and the interior wall of exterior tube 1. Additionally, boss 20 in FIG. 3b is provided with an indented curved groove dimensioned to accommodate beveled end 16 of first intermediate tube 2 in the assembled configuration. Accordingly, this indented curved groove is tapered so as to provide a seal with beveled end 16 in the assembled configuration.

FIG. 3a shows (in phantom) two corresponding bosses 20 having terminal ends 17. The two bosses 20 in FIG. 3a are substantially aligned with one another and are contiguous with elastic end wall A and form peninsular extensions thereof. A first of the bosses 20 in FIG. 3a extends between first intermediate tube 2 and internal tube 4, while the second of the bosses 20 is provided on the exterior wall of first intermediate tube 2.

During assembly, the bosses of the two subassemblies 2-A-4 and 1-B-3 are aligned such that the terminal end 17 of the bosses 20 in FIG. 3a will abut the terminal end 18 of the boss 20 in FIG. 3b in the assembled configuration. During such assembly, beveled end 16 seals in the tapered slot provided in boss 20 in FIG. 3b and provides a stop to indicate that an appropriately configured assembly has been obtained.

The appropriate alignment of the terminal ends 17 and 18 creates the nonpermeable partitions 18 and 20 shown in FIG. 4. Additional bosses could be provided to create additional partitions if appropriate.

The above described method of creating partitions within the enclosed annular spaces is preferred. However, those skilled in the art will recognize that other methods and devices may be substituted without departing from the spirit or the scope of the invention as set forth in the appended claims.

In addition, the thin membranes 11 of the rigid intermediate tube 3 are preferably produced by blocking with the elastomer compound, during casting, the windows cut into the wall of said rigid intermediate tube 3.

FIG. 3c shows the exterior of the rigid internal tube 4 and of the rigid intermediate tube 2 with its crimped zone 6 containing the holes 8 for communication with the chambers containing the damping liquid.

FIG. 4, a section along the center plane in FIG. 2 across the laminar passage 7, illustrates the arrangement of the communications between the chambers.

It shows the concentric arrangement, from the outside of the device to the inside, of the constituent elements, i.e.:

the rigid external tube 1, continuous and with sufficient external geometric precision to be fitted into a rigid socket, which has an elastomer compound zone forming a pad (or boss or partition) 20, cast in the elastic lateral wall B, to fill up the crimped zone of the rigid intermediate tube 2, which communicates with the column of damping liquid contained in the laminar passage 7 between the holes 8 in the rigid intermediate tube 2;

the rigid intermediate tube 2, cut in the crimped zone where the holes 8 have been cut for communication with the chambers, on either side of the ends 18 of the pad (or boss or partition) 20 of the elastic lateral wall B, which separates these two chambers;

the elastic lateral wall B, seen head-on, cut here only in the plane of the ends 18 of the pads (or bosses or partitions) 20, more precisely in tight contact with the ends 17 of the identical pads (or bosses or partitions) 20 on the elastic lateral wall A;

the elastic lateral wall B is bonded to the rigid external 1 and intermediate 3 tubes and the pads (or bosses or partitions) 20 face the ends 18 of the pads (or bosses or partitions) on either side of a slot where, during fitting, the end 16 of the rigid intermediate tube 2 fits;

the rigid intermediate tube 3, which includes the two thin membranes 11, of elastomer compound of the same thickness as the rigid intermediate tube itself, which plug up the windows made in said tube;

between the rigid intermediate tube 3 and the rigid internal tube 4, the elastomer compound film 9 (seen head on), spread during fitting or expansion;

the rigid internal tube 4 of sufficient thickness to allow tightening by means of an attachment bolt (not represented).

FIGS. 5a, 5b shows a variant of the elastic antivibration isolation device, where communication between the chambers, provided by the holes 8 in FIG. 2, is realized by a groove 8a, formed in the elastic lateral wall B, on either side of the end of the pad (or boss or partition) 18, which is cast with the elastic lateral wall B.

FIG. 5a shows the position of a sealed rivet 21 making possible, in a "submarine" variant of the assembly process, the filling of the device by means of the vacuum created by an orifice subsequently closed by said rivet.

FIG. 5b is a cross section of the device along Plane C in FIG. 5a. In contrast to FIG. 4, this section does not cut the rigid intermediate tube 2, which is seen only head on, as is the elastic lateral wall A, illustrating one possibility of locating the cells shown in cross section in FIG. 2. This figure also shows the communication between the annular chambers filled with damping liquid, via the grooves 8a beyond the end of the pad (or boss or partition) 18.

The alternative embodiment shown in FIGS. 5a and 5b enables the present invention to be employed without the necessity of drilling holes 8 utilized in the first embodiment described above. In some circumstances, it may be preferable to not have to drill holes 8 in the intermediate tube 2, since such a drilling operation might deform the intermediate tube 2 and damage the seal which beveled end 16 makes with boss 20.

Referring first to FIG. 5b, wherein like reference numerals have been used to indicate structural elements similar to those of the first embodiment described above, it will be seen that, as shown in FIG. 5a, the annular space between external tube 1 and first intermediate tube 2 is filled with an elastomeric material which is an extension of lateral end wall B. Referring back to FIG. 2, it will be appreciated that the elastomeric material which fills this annular space corresponds to the uppermost protruding leg portion of lateral end wall B shown there. Thus, this leg portion of end wall B, by reason of the seal which it forms with beveled end 16 of first intermediate tube 2 seals off the laminar passage 7 from the interior damping fluid chambers. In the first embodiment described above, communication between the interior damping fluid chambers and the laminar passage 7 is provided by selectively placing holes 8 so as to produce a relatively long inertial column of damping fluid.

In the embodiment of FIGS. 5a and 5b, in contrast, communication between the damping fluid contained in the interior chambers and the laminar passage 7 is provided by grooves (or recessed portions) 8a selectively placed so as to provide a similarly relatively long inertial column of damping fluid.

Referring most particularly to FIG. 5b, it will be appreciated that it is only at grooves (or relieved portions) 8a that damping fluid can flow from the interior chambers, around the end edge of first intermediate tube 2 to thereby reach laminar passage 7. While laminar passage 7 is not specifically shown in FIGS. 5a and 5b, it will be appreciated that were FIG. 5b to be a section at the approximate midpoint of the vibration isolation device (that is, cutting through laminar passage 7), the annular space between external tube 1 and first intermediate tube 2 would appear as filled with a damping fluid and separated by partitions 18, rather than as predominately filled with the extension of elastomeric end wall B, as is presently shown in FIG. 5b.

Grooves (or indented recesses) 8a run parallel to the generatrices of the external surface of the device and provide a means of extending the laminar passage at right angles thereto. This extension of the inertial damping fluid column provides an improvement in terms of its dynamic damping effect.

The processes for the realization of the elastic antivibration isolation device for hydraulic damping of the radial elasticity are also an object of the invention.

A preferred process for the fabrication of such a device consists of performing the following operations:

The two assemblies 2-A-4 and 1-B-3, illustrated in FIGS. 3a and 3b, are produced by pressure casting with a heat treatment which simultaneously vulcanizes the elastomer compound and produces a bond between the elastomer compounds and the rigid internal, intermediate and external tubes, which act as frameworks, according to a process conventionally used in the rubber transformation industry:

An assembly operation, using a so-called "submarine" assembly press, makes it possible to join the tube assemblies 2-A-4 and 1-B-3, described in FIGS. 3a and 3b, from which all the air bubbles have been expelled. The end 19 of the rigid intermediate tube 3 is freely engaged over the rigid internal tube 4, while the preferably bevelled end 16 of the rigid intermediate tube 2 is engaged in the rigid external tube 1, until the thin layer of elastomer compound 5 and the elastomer compound film 9 prevent further penetration.

A fitting force is exerted, then, by staggered circular stops which are provided on the external edge of each of the rigid tubes, at a regulated rate, so that an appropriate internal pressure is maintained by the characteristic rigidity of the elastic lateral walls A and B.

Another assembly process uses a radial crimping machine for the rigid intermediate tube 2 and an expansion of the rigid internal tube 4.

A variant of the process consists of voiding the vessel prior to filling it with the liquid which will perform the damping function, and then plugging up the filling hole with a blind sealed rivet, like that designated 21 in FIGS. 5a, 5b.

In conclusion, the antivibration isolation device with hydraulic damping of the radial elasticity, which is the object of the invention, exhibits the following advantages:

ease of assembly equivalent to that of a "round strut"; it can be installed during the preparation phase, away from the assembly line, by fitting onto a power unit, and can be fixed in place during assembly by a bolt running all the way through, either cantilevered or with a flange;

guarantee of a large variation in rigidity, required between a zone of good filtering of vibrations with a short movement distance and its function as a stop, but still elastic, for the motor torque or the motor braking, as a result of the complex shape cast into the elastic lateral walls, made of an elastomer compound with an appropriate formulation;

integration, during construction of the device, of a hydraulic type damping based on the inertial effects of a long spiral column of liquid which amplifies, in the ratio of the cross sections, the inertial effect of the damping liquid, passing from one chamber to the other during the movement away from the center position of the elastic support at low frequencies:

elimination of the risk of blockage of movements by a device consisting of flexible membranes with limited movement, acting as a bypass for this damping liquid over a very short distance, which overcomes the apparent rigidity which this inertial blockage would represent for higher-frequency vibrations;

adaptability to utilization requirements, because a technician skilled in the art, without modifying the structural devices, can select between one or two maximum values of the apparent rigidity as a function of the frequency of operation, depending on the application at hand, by filling a cavity with air or with damping liquid; a simple venting groove made in the elastomer compound film between one of the rigid intermediate tubes and the rigid external tube differentiates the two configurations of the same device.

It is possible to take advantage of this adaptability to realize, on a vehicle just off of the assembly line, a modification of the device, making it possible, for example, to tune the mechanical characteristics of the suspension and those of the tires, for example.

The device for hydraulic damping of radial elasticity which is the object of the invention is designed to provide antivibration isolation for machines or vehicle motors.

A technician skilled in the art can, of course, make various modifications to the antivibration isolation device with hydraulic damping of the radial elasticity and to its variants, which are described here solely for purposes of illustration and not intended to limit the invention in any way, without going beyond the context of the invention.

The invention as described hereinabove in the context of the preferred embodiments is not to be taken as limited to all of the provided details thereof, since modifications and variations thereof may be made without departing from the spirit and scope of the invention.

What is claimed is:

1. A vibration isolation apparatus, said apparatus comprising:

an external tube member;

a first intermediate tube member positioned substantially concentric with and within said external tube member;

said external tube member and said first intermediate tube member forming a first annular space therebetween;

at least one additional tube member positioned substantially concentric with and within said first intermediate tube member;

said first intermediate tube member and said at least one additional tube member forming a second annular space therebetween;

said external tube member, said first intermediate tube member and said at least one additional tube member each having a first end and a second end;

first flexible lateral end wall means for flexibly positioning and interconnecting said first ends of said first intermediate tube member and said at least one additional tube member;

second flexible lateral end wall means for flexibly positioning and interconnecting said second ends of said first intermediate tube member and said at least one additional tube member;

a first substantially nonpermeable partition positioned within said first annular space and extending between said first and second flexible lateral end wall means;

substantially nonpermeable divider means for dividing said second annular space into first and second chambers;

first orifice means for establishing communication between said first annular space and said first chamber;

second orifice means for establishing communication between said first annular space and said second chamber; and a damping fluid contained within said first annular space and said first and second chambers;

wherein said at least one additional tube member is provided with flexible peripheral means for expanding said second annular space in response to pressure transmitted by said damping fluid; and wherein said flexible peripheral means comprises at least one window opening provided in side at least one additional tube member, and a flexible membrane extending over said at least one window opening.

2. The apparatus according to claim 1, wherein said flexible peripheral means comprises at least two window openings provided in said at least one additional tube member and a flexible membrane extending across each of said at least two window openings, and wherein one side of each of said flexible membranes is in contact with said damping fluid and the opposite side of each of said flexible membranes is in communication with the ambient atmosphere.

3. A vibration isolation apparatus, said apparatus comprising:

an external tube member;

a first intermediate tube member positioned substantially concentric with and within said external tube member;

said external tube member and said first intermediate tube member forming a first annular space therebetween;

at least one additional tube member positioned substantially concentric with and within said first intermediate tube member;

said first intermediate tube member and said at least one additional tube member forming a second annular space therebetween;

said external tube member, said first intermediate tube member and said at least one additional tube member each having a first end and a second end;

first flexible lateral end wall means for flexibly positioning and interconnecting said first ends of said first intermediate tube member and said at least one additional tube member;

second flexible lateral end wall means for flexibly positioning and interconnecting said second ends of said first intermediate tube member and said at least one additional tube member;

a first substantially nonpermeable partition positioned within said first annular space and extending between said first and second flexible lateral end wall means;

substantially nonpermeable divider means for dividing said second annular space into first and second chambers;

first orifice means for establishing communication between said first annular space and said first chamber;

second orifice means for establishing communication between said first annular space and said second chamber; and a damping fluid contained within said first annular space and said first and second chambers;

wherein said at least one additional tube member comprises a second intermediate tube member positioned substantially concentric with and within said first intermediate tube member, said first and second intermediate tube members forming said second annular space therebetween, and an internal tube member positioned substantially concentric with and within said second intermediate tube member, said second intermediate tube member and said internal tube member forming a third annular space therebetween, and wherein said second intermediate tube member is provided with flexible peripheral means for expanding said second annular space in response to pressure transmitted by said damping fluid; and wherein said flexible peripheral means comprises at least one window opening provided in said second intermediate tube member, and a flexible membrane extending over said at least one window opening.

4. The apparatus according to claim 3, further comprising annular space confining means for confining said damping fluid in said first annular space to a relatively narrow passage extending between said first and second orifice means.

5. The apparatus according to claim 4, wherein said relatively narrow passage, extending between said first and second orifice means, extends along at least three-quarters of the circumference of said first annular space.

6. The apparatus according to claim 5, wherein said relatively narrow passage is a substantially laminar passage.

7. The apparatus according to claim 5, wherein said flexible peripheral means comprises at least two window openings provided in said second intermediate tube member and a flexible membrane extending across each of said at least two window openings, and wherein one side of each of said flexible membranes is in contact with said damping fluid and the opposing side of each of said flexible membranes is in communication with the ambient atmosphere.

8. The apparatus according to claim 7, wherein said third annular space between said second intermediate tube member and said internal tube member is filled, at least in part, by an elastomer compound film, and wherein said elastomer compound film has a groove for providing said communication between said opposing side of said membrane and said ambient atmosphere.

9. The apparatus according to claim 7, wherein said second intermediate tube member and said internal tube member are positioned and spaced from each other by said first and second flexible lateral end wall means such that, upon application of a high frequency vibration to said vibration isolation apparatus, said membrane is adapted to bulge into said third annular space and contact said internal tube member, thereby substantially increasing the dynamic return rigidity of said vibration isolation apparatus normally blocked at said high frequency vibration by the inertial effect of the column of damping fluid contained in said relatively narrow annular passage.

10. The apparatus according to claim 5, wherein said first and second flexible lateral end wall means also enclose said third annular space, and wherein said third annular space also contains a damping fluid.

11. The apparatus according to claim 10, wherein said second intermediate tube member and said internal tube member are positioned and spaced from each other by said first and second flexible lateral end wall means such that, upon application of a high frequency vibration to said vibration isolation apparatus, said membrane is adapted to bulge into said third annular space and contact said internal tube member, thereby substantially decreasing the dynamic return rigidity of said vibration isolation apparatus normally blocked at said high frequency vibration by the inertial effect of the column of damping fluid contained in said relatively narrow annular passage.

12. The apparatus according to claim 3, wherein sad substantially nonpermeable divider means comprises second and third substantially nonpermeable partitions positioned within said second annular space and extending between said first and second flexible lateral end wall means, and wherein said first, second and third substantially nonpermeable partitions each comprise at least one boss formed integral with one of said first and second flexible lateral end wall means.

13. The apparatus according to claim 3, wherein one of said flexible lateral end wall means comprises an elastomeric material having a portion extending inward along the inner surface of said external tube member and contacting said first intermediate tube member to bound, at least in part, said relatively narrow passage, and wherein said first and second orifice means comprise grooves formed in said inwardly extending portion of elastomeric material, said grooves being substantially parallel to said concentric axes of said external, said first intermediate and said at least one additional tube members.

* * * * *